No. 638,267. Patented Dec. 5, 1899.
J. NORTON.
DIGESTER LINING.
(Application filed Mar. 20, 1899.)
(No Model.)
Fig 1.
Fig 2.
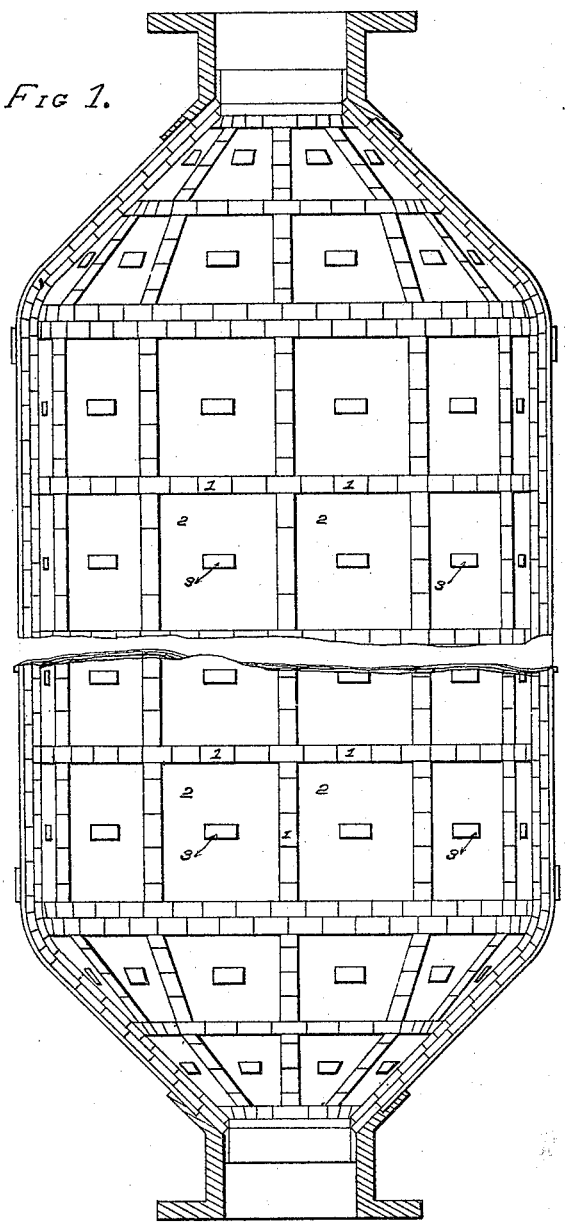
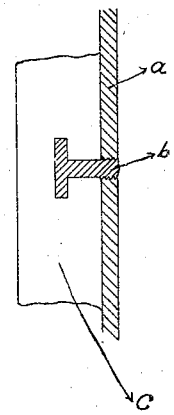
WITNESSES:
Joshua Norton
INVENTOR.

UNITED STATES PATENT OFFICE.

JOSHUA NORTON, OF BOSTON, MASSACHUSETTS.

DIGESTER-LINING.

SPECIFICATION forming part of Letters Patent No. 638,267, dated December 5, 1899.

Application filed March 20, 1899. Serial No. 709,775. (No model.)

*To all whom it may concern:*

Be it known that I, JOSHUA NORTON, a resident of Boston, Massachusetts, have invented certain new and useful Improvements in Sulfite-Pulp-Digester Linings; and I do hereby declare the following to be a full, clear, and exact description of the invention, such as will enable others skilled in the art to which it pertains to use the same.

The invention relates to the lining of sulfite-digesters for paper-pulp, and has for its object to provide such a digester with an acid-resisting non-shrinking sectional lining that will prevent the costly and troublesome tendency to crack existing in the present methods and the resulting damage to the metal shell.

I will describe one cause of trouble and my method of prevention. A "continuous" cement lining is subject to a certain amount of shrinkage under the conditions to which it is exposed. This shrinkage in a cylindrical digester reduces the diameter of the lining, drawing it off from the shell toward the center. When pressure is afterward put on from the inside, the lining is forced outward and cracks, the openings in these cracks being sometimes one-fourth inch wide. I find that the shrinkage in a section of cement two or three feet square is not enough to cause cracks. I also find that vitrified brick or tile do not shrink under the same condition as the cement to the same degree—in fact, hardly to any degree. I therefore divide the cement into sections by introducing courses of vitrified tile or their equivalent.

My present method is to lay courses around the digester laterally at about two or three feet apart and like courses vertically, consisting of tile laid closely in contact with the shell and with each other, sufficient cement only being used to hold the tile together, none being used between the tile and shell. The spaces of about two feet square between these courses of tile are filled with cement. These courses of tile are of such restraining influence on the cement as to hold it stationary and prevent shrinkage to any injurious extent. In the center of the spaces for cement there may be placed T-bolts, firmly screwed into the digester-shell from the inside, leaving the head projecting into the digester about one and one-half inches, which, becoming bedded in the cement, will be an additional security and create an immovable center by which contraction, if any, must be controlled. This one method of applying my lining is a reliable one; but I do not confine my invention to it alone, as it will be readily understood that other ways could produce the same result—for instance, the space between the tile could be reduced with good result—my aim being to break the continuity of cement by a sufficiently strong tile structure to overcome the shrinkage of the cement.

The accompanying drawings represent a longitudinal cross-section of a digester, Figure 1 being the digester; 1, sections of courses of tile; 2, the spaces to be filled with cement; 3, the T-bolts.

Fig. 2 shows a cross-sectional view of T-bolt and the method of attaching it to digester-shell, a being the digester-shell, b the T-bolt, and c the cement.

Having described my invention, what I claim is—

1. A digester-lining, composed of tiles, laid in courses, with spaces between the courses, the tiles in each course being in close contact with the shell of the digester and with each other, and a cement filling in each space between the courses, as described.

2. A digester-lining, composed of tiles, laid in courses, with spaces between the courses, the tiles in each course being in close contact with the shell of the digester and with each other, a cement filling in each space between the courses, and a T-bolt screwed into the shell of the digester and embedded in each cement filling, as described.

3. A digester-lining of cement and courses of vitrified tile, in which the continuity of the cement is broken by the courses of vitrified tile, as described.

In testimony whereof I have signed this specification in the presence of two subscribing witnesses.

JOSHUA NORTON.

Witnesses:
JOHN H. NORTON,
JAS. W. CARTWRIGHT.